INVENTOR.
ROBERT E. RUSH
BY
Roland A. Anderson
Attorney

*INVENTOR.*
ROBERT E. RUSH
*BY*
[signature]
Attorney

INVENTOR.
ROBERT E. RUSH
BY
Roland A. Anderson
Attorney.

United States Patent Office 3,272,658

Patented Sept. 13, 1966

3,272,658

RADIOISOTOPE HEATED THERMOELECTRIC GENERATOR POWER FLATTENING SYSTEM

Robert E. Rush, Livingston, N.J., assignor to the United States of America as represented by the United States Atomic Energy Commission Filed Nov. 30, 1962, Ser. No. 241,447

6 Claims. (Cl. 136—201)

This invention relates to radiosotope heated thermoelectric generators and more particularly to power output flattening systems therefor.

Radioisotope heated thermoelectric generators have been useful for remote electrical power sources in outer space craft ranging from earth satellites to extra terrestial vehicles. Due to the radio-nuclide decay of their radioisotope heat source, however, these devices have had a power output decline which has limited their usefulness and operating lifetimes. It has been universally recognized, therefore, that it would be advantageous to provide means for flattening the power output of these generators. Additionally, it has been advantageous to provide an automatic power flattening system with components having low weight, high efficiency, safety and reliability.

It is an object of this invention, therefore, to provide a power output flattening system for a radioisotope heated thermoelectric generator.

It is also an object of this invention automatically to flatten the power output in a radioisotope heated thermoelectric generator for use in outer space.

It is also an object of this invention to provide a radioisotope powered thermoelectric generator with a lightweight, efficient, safe and reliable power flattening system.

By this invention a heat rejection and throttling system is employed to flatten the power output in a thermoelectric generator. The method and construction involved in this invention utilize standard and well known techniques and apparatus and are highly flexible for a wide range of applications, types of loads, power levels and operating lifetimes. More specifically, in one embodiment, this invention involves an external variable area radiator forming an external heat rejection path for excess heat from the source and the heat rejection is throttled to maintain a constant heat flux as the thermal output from the heat source decreases. The radiator system is arranged with removable sections for throttling the heat rejection and the removal of these sections is responsive to time and temperature. With the proper adjustment a constant power output will be maintained and the last radiator segment will be ejected toward the end of the generator mission lifetime to provide high end-of-mission efficiency.

Various other obejcts and advantages will appear from the following description of the invention, and the novel features will be particularly pointed out hereinafter in connection with the appended claims.

In the drawings where like parts are marked alike:

Figures 1, 2, 3:
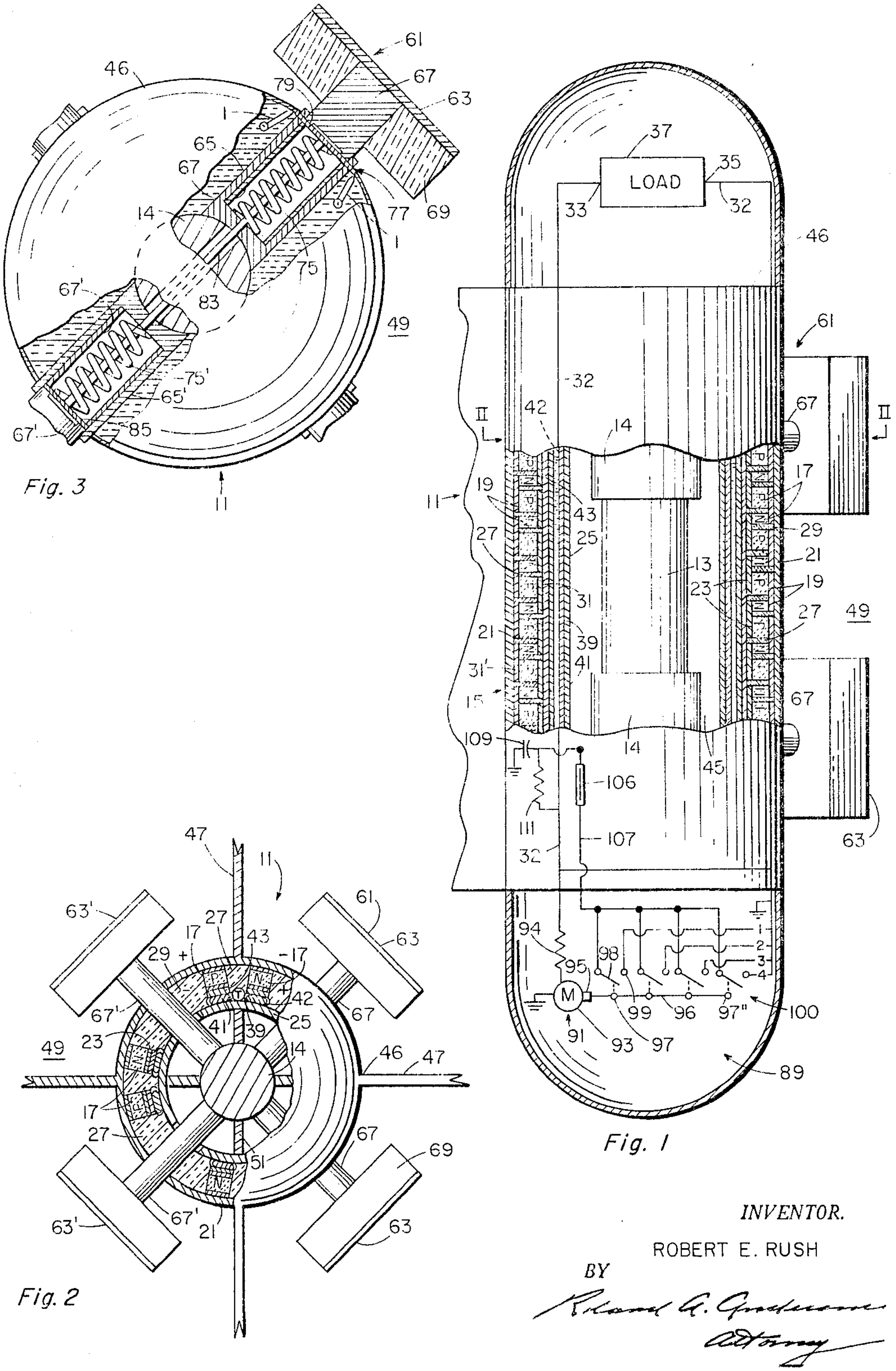
FIG. 1 is a partial cross section of a radioisotope heated thermoelectric generator.
FIG. 2 is a partial cross section through II—II of the embodiment of FIG. 1.
FIG. 3 is a partial cross section of the ejectment system of the apparatus of FIG. 2.
Figure 4:
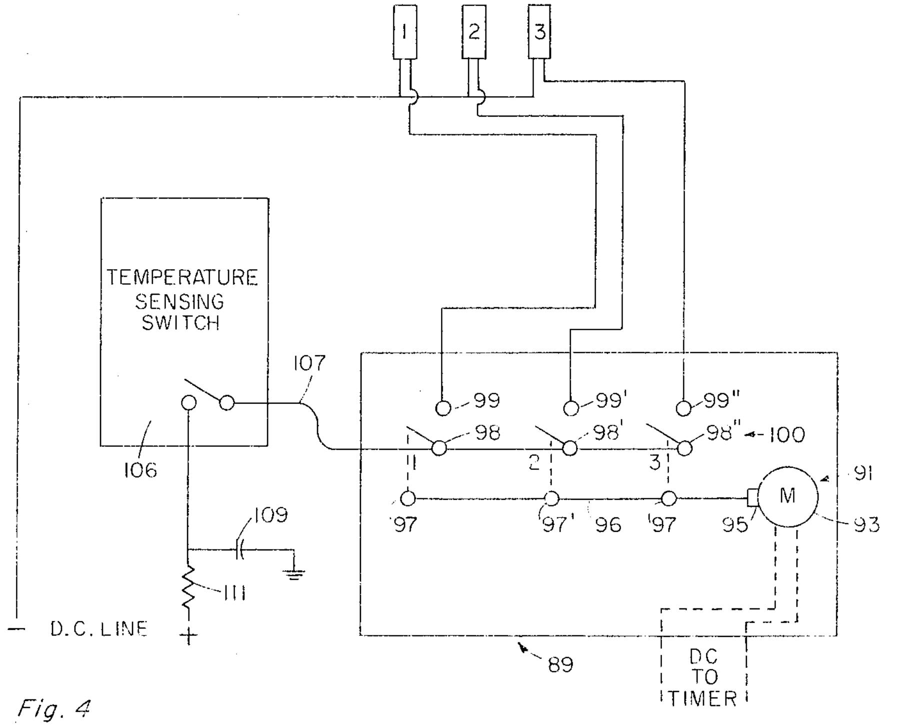
FIG. 4 is a partial schematic view of the control for the ejectment system of FIG. 3.

Referring to FIG. 1, generator 11 has a suitable radioisotope (radio-nuclide) heat source 13 supported by suitable thermally conducting supports 14 which conduct heat to various thermocouples. Suitable radio-nuclides include strontium 90, curium 242, cobalt 60, cesium 137, cerium 144, plutonium 238 and polonium 210, which like curium 242 has a power density of 100–120 watts/gram, or any other radioisotope heat source since all their radio-nuclide decays cause the same need for a power flattening system.

For convenience and ease of explanation, strontium 90 is described hereinafter as the heat source although any of the above may be used. $Sr^{90}$ may be supplied by the Oak Ridge National Laboratory, comprising about 5.8% of the by-products of the slow neutron fission of $U^{235}$.

Converter assembly 15 converts the heat from source 13 into usable electrical energy. To this end, the converter 15 has an annular array of thermocouples 17 around heat source 13 with cold junctions 19 held relatively at a low temperature by an aluminum outer shell 21 and cooling fins 47 which radiate heat from the cold junctions to the surrounding environment, e.g. outer space, and hot junctions 23 heated relatively to a high temperature by a concentric stainless steel clad aluminum inner shell 25 in which supports 14 hold the heat source 13 so as evenly to heat shell 25. Advantageously spaced N and P type thermocouples 17 alternate and provide alternate positive and negative junctions. Min-k or glass wool 27 in spaces 29 between the thermocouples insulates the thermocouples from each other while aluminum connectors 31 connect the adjacent positive and negative junctions across the spaces 29 to connect the thermocouples in series with a suitable lead 32 connected with the positive and negative terminals 33 and 35 of load 37. Advantageously, load 37 is a battery, radio or the like.

Small oblong stainless steel compliant members 39 have a toroidal cross section forming a closed chamber 41 is filled with a high thermal conductivity eutectic 42, such as NaK, which has convective heat transfer in its liquid state. The compliant members 39 are under compression and press on one side against the outside of inner shell 25. On the other side they press against high heat conductivity beryllium members 43 interposed between compliant members 39 and hot junction connectors 31 of each thermocouple 17. The described system holds the respective thermocouple hot junctions tightly against their respective hot junction connectors 31 and the respective cold junction connections 31' against their respective cold junctions and the inside of outer shell 21. Various of the elements may also be brazed. The inside of shell 21 and the adjacent connectors 31' conform and the shell has an anodized inner surface to insulate the outer shell 21 from connectors 31'.

From the above, it will be understood that a heat path is provided from source 13, across space 45 (which is inside inner shell 25), and through inner shell 25. This heat path continues through compliant members 39, the filling 42 in compliant members 39, high heat conductivity members 43, connectors 31, thermocouples 17, connectors 31', and primary radiator 46 comprised of outer shell 21 and cooling fins 47, to the space 49 (e.g. outer space) surrounding the shell 21 and its fins 47.

The axis of fins 47 on the outside of outer shell 21 and the axis of connecting ribs 51 on the inside of inner shell 25 are advantageously spaced so as evenly to conduct heat radially. Members 14 and 51 axially evenly spread the heat from source 13 to the thermocouples strung axially out beyond the heat source 13. The high thermal conductivity of members 43 has the advantage of minimizing the weight for a given temperature drop across the members 43.

Cast lead telluride P and N type thermocouple elements 17 are suitable. These are available, for example, from the Minnesota Mining & Mfg. Co. The P type element is doped with 1.0% Na and the N type element is doped with 0.3% $P/SI_2$. The interconnecting electrical leads from the thermocouples may be brazed or soldered to their terminals with suitable material that has an operating temperature above the normal operating temperature of generator 11.

As is well known, a temperature differential between the hot junctions and the cold junctions of thermocouples causes a current flow in a load, like load 37, connected to the thermocouple junctions. The sizes of the thermocouples may be calculated. For example, for a temperature between 65° and 454° C., the average Seebeck coefficients, electrical resistance and thermal conductivity may be calculated, averaging readings 50° F. apart over the range, to be:

| P-type | | N-type |
|---|---|---|
| 205 | μV/°C. | 223 |
| 0.002672 | Ohm-cm. | 0.002215 |
| 0.0179 | Watts/cm.°C.$^{-1}$ | 0.0206 |
| 3.30 | Length (cm.) | 3.30 |
| 2.023 | Area (sq. cm.) | 1.690 |

Open circuit voltage, per pair of thermocouples, 0.166 volt.
External lead voltage available per pair, 0.094 volt.
Number of pairs to produce 12 volts, 132 pairs.

Figure 5:
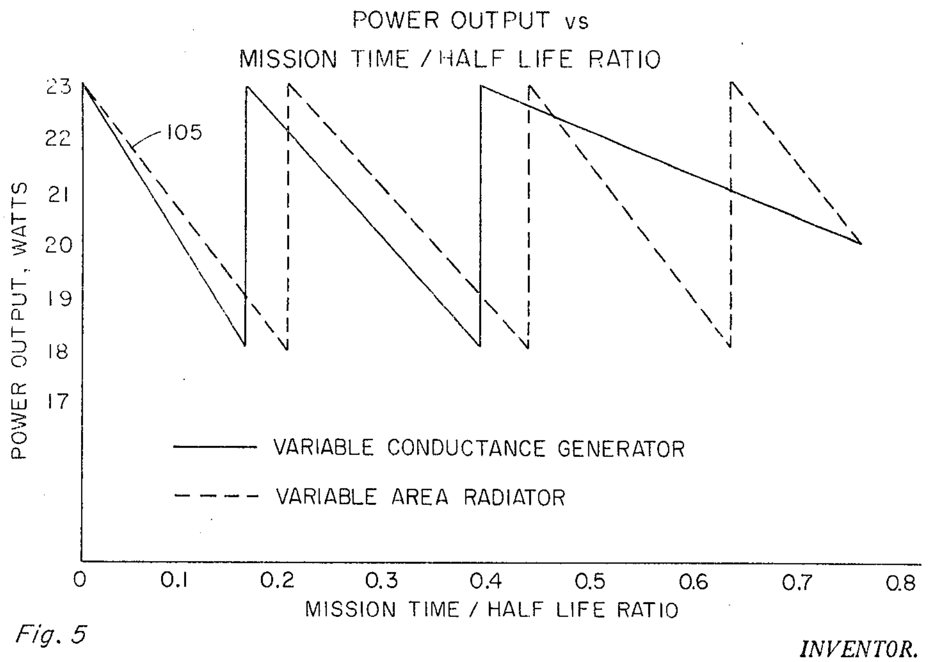
FIG. 5 is a graphic representation of the power in watts vs. the mission time/half life ratio of the generator of FIG. 1.
Figure 6:
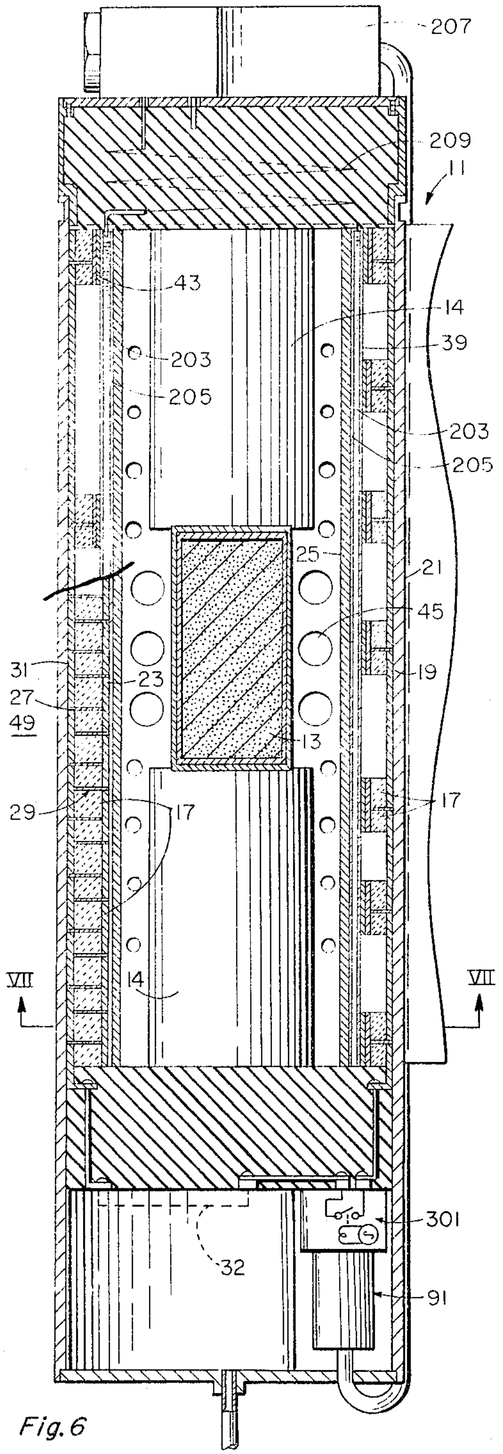
FIG. 6 is a partial cross section of another embodiment of apparatus of FIG. 1.

The fuel activity will decrease at a rate corresponding, for example, to the rate of decline of the first portion of the dashed line 105 in FIG. 5. Decline for ¾ of a half-life results in a 300° F. hot junction temperature variation. This has led heretofore to a shortened operating or mission life, inefficient use of the source 13, or other problems in using radioactive power source 13. It has been universally accepted, therefore, that there is a need for a power output flattening system for radioisotope thermoelectric generators. It has also been advantageous to flatten this power output in a system with low weight, high efficiency, safety and reliability.

Referring now to FIGS. 2 and 3 in accordance with this invention a secondary external radiator 61 controls the dissipation of excess heat energy from source 13. This radiator forms independent secondary external heat rejection paths and these paths are throttled down as the thermal output of the heat source 13 decreases. To this end the radiator 61 has a plurality of ejectable segments 63, each respectively forming substantially non-interacting external heat conducting paths from source 13 to the space 49 around outer shell 21. Each of these heat conducting paths has a heat conducting cylindrical sleeve 65 connected between inner and outer elements 14 and 21. The major portion of the heat flow through each of these paths, flows from source 13, through supports 14, stainless steel sleeves 65, hollow stems 67 and spaced heat conducting segments 63, made of high heat conductivity material such as aluminum, to space 49. The adjacent paths are directed radially at right angles along a plane and extend away from outer shell 21. Also, these segments 63 advantageously each have a large flat active radiator surface area exposed to space 49 and a thin cross section spaced from outer shell 21. This enables these segments 63 thermally to be highly directional, reject heat efficiently and be shielded effectively against thermal feedback between adjacent radiators, as well as between the primary and secondary radiators, by thin light weight insulator 69 on the underside of radiators 61 and made from Min-k insulation or the like. The exposed portions of the primary and secondary radiators, except the outside of radiators 61, are coated to minimize heat rejection therefrom, such as by a gold flash on a palladium plating. This provides low emmissivity e.g. only of about 0.03.

The secondary radiator can be operated at a higher temperature (about 750°–850° F.) than the primary radiator resulting in a secondary radiator area of only one-tenth of a square foot and a weight of only one-tenth of a pound for an 0.016″ thick Al radiator.

The stem 67 and sleeve 65 of the secondary radiator enclose a normally compressed Rene 41 coil spring 75 which will eject the stem 67 from sleeve 65 and their segment 63 away from generator 11 with a three pound force. Means 77, advantageously comprising an exothermic or burnable fuse wire 79, such as the "Pyrofuse" brand fuse wire made by the Sigmund Cohn Corp., normally retains the springs 75 in their compressed condition. Advantageously, the fuse wire 79 passes through the side of one sleeve 65 and stem 67 and as shown in FIG. 3, and a burnable extension 83 connects the main wire 79 with an opposite retaining pin 85 through opposite stem 67′. This retains the opposite spring 75′ under equal compression. Also, these connections provide for the simultaneous release of opposite segments 63. When fuse 79 ignites, for example, the opposite springs retained by the fuse 79 and its extension 83 safely and dependably release simultaneously the stems 67 and 67′ and segments 63 associated with these springs 75 and 75′. The simultaneous opposite release of springs 75 and 75′ negates unwanted thrusts which could change the course of generator 11 in space.

Control means 89 suitably programs the sequential ejection of secondary radiator segments 63. To this end timer 91 has a motor 93 with a suitable power source such as a small bleed resistor 94 connected to lead 32. The motor 93 has a suitable gear train 95 which slowly rotates a shaft 96 having radially adjustable cams 97, 97′ and 97″ thereon. These cams rotate against corresponding armatures 98 to engage them with their corresponding companion contacts 99 of multi-contact switch 100. Radial adjustment of the high spot of the cams provides an adjustment for the time intervals between the sequential engagement of the various contacts.

The sequential engagement of armatures 98 and contacts 99 triggers the ejectment of the radiator segments 63 and by the end of the mission of generator 11, all the radiator segments are ejected to provide essentially zero heat rejection through the secondary radiator and peak end-of-mission efficiency. Also, the ejectment sequence controls the thermal flux in the generator 11 and keeps it between predetermined limits despite the radio-nuclide decay of source 13. A suitable sequence, is illustrated in FIG. 5 by the dashed line 105, wherein the power output is maintained between 23 and 18 watts for .75 or more of the mission/half life ratio.

If the generator 11 performs as predicted then the bimetallic temperature sensor 106, such as a suitable thermostat 106 which has a conventional temperature adjustment, and the timer 91 will both call for rejection. If, on the other hand, the timer calls fo rrejection prior to the time a significant power output reduction occurs, then rejection will not take place. To this end the sensor 106 is placed between adjacent thermocouples 17 at the hot junction 23 thereof corresponding e.g. to location T in FIG. 2, and conducts when a minimum desired hot junction temperature is reached. This closes the contacts of the sensor 106 to pass sufficient current through lead 107 and across the suitably engaged armatures and contacts 98 and 99 to actuate the ejectment mechanism for segments 63.

In a typical sequence when the contacts of sensor 106 are open, capacitor 109 charges from a suitable source, such as lead 32. When the sensor contacts engage and armature and contacts 98 and 99 sequentially engage, current flows sequentially to actuators labeled for convenience 1, 2, 3, and 4, such as suitable electrical spark gaps for both ends of fuse wires 79. These actuators triggers the release of the respective segments 63 by igniting the fuse wires 79. The resistance 111 minimizes the discharge load on the capacitor energy source.

The following is a summary of typical system performance.

Variable air power flattening with (heat source weight 0.5 pounds):

| | |
|---|---|
| Electrical power output ---------------watts-- | 18–23 |
| Voltage --------------------------------- | 6 |
| Efficiency, end-of-life ---------------percent-- | 4 |
| Mission time/half life ratio ---------------- | 0.75 |
| Overall system weight --------------pounds-- | 5 |
| Weight of Power Flattening System ------do---- | .93 |
| Watts/pound ----------------------------- | 4 |
| Hot junction temperature --------------° F-- | 950 |
| Cold junction temperature -------------° F-- | 550 |

In the operation of an embodiment of this invention, the temperature of outside space 49 normally remains constant. The power output of generator 11 corresponds to the heat input to the thermocouples connected to load 37 and starts at about 23 watts. Initially the excess heat rejection is about 40%. When the mission time/source 13 half life ratio is about .2 (e.g., 5.6 yrs.) the power output has decreased from 23 to 18 watts. Thereupon, timer 91 calls for the ejectment of the first secondary radiator segments 63. The thermal flux in the generator 11 has correspondingly decreased and thermostat 106 also calls for ejectment of the first pair of segments 63. Thereupon, capacitor 109 discharges through actuator 1 to ignite a first fuse wire 79 releasing segments 63 and 63'. This increases the heat input to the thermocouples 17 and increases the power output to about 23 watts. When the mission time/source half life ratio reaches about .43 (e.g., 12.04 yrs.) timer 91 and thermostat likewise call for the ejectment of a pair of secondary radiators and the power output has again decreased to about 18 watts. Thereupon capacitor 109 discharges through actuator 2 to ignite a second fuse wire 79 releasing second segments 63 and 63'. This again increases the temperature input to the thermocouples 17 and increases the power output to about 23 watts. When the mission time/source 13 half life ratio reaches .62 (e.g., 17.36 yrs.) the power again has decreased to about 18 watts and capacitor 109 discharges through actuators 3 or 4 respectively to eject 2 more sets of segments 63 and 63' thus completing the ejectment of the radiator segments 63 and 63' as illustrated in FIG. 5. This maintains a constant thermal input and power output until the mission time/half life ratio is .75 or more. Upon each ejectment of segments 63, the heat input to the thermocouples 17 increases and the power output increases to about 23 watts. After all the segments 63 are ejected, the excess heat rejection is essentially zero.

Figure 7:
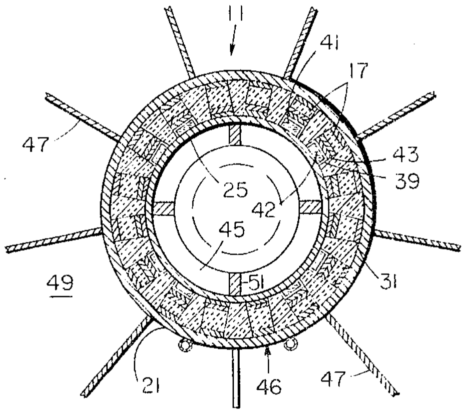
FIG. 7 is a partial cross section through VII—VII of the apparatus of FIG. 6.
Figure 8:
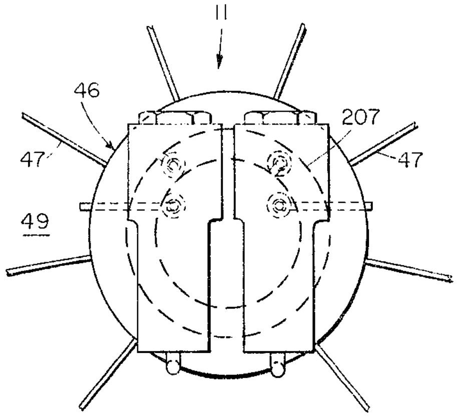
FIG. 8 is a partial end view of the apparatus of FIG. 6.

Referring now to FIG. 7, a configuration is shown in which a variable conductance is provided for flattening the power output of a radio-isotope heated thermoelectric generator. In this embodiment the heat source and thermocouples are the same as source 13 and thermocouples 17 described above and the heat spreading and enclosure shells are the same as shells 25 and 21 of the embodiment of FIG. 1. Here, however, the secondary radiator is omitted and the rejection of heat through the primary radiator is throttled internally. To this end, heat conducting eutetic 203 such as NaK is released from channels 205. This may be through valve 207 upon command from actuators 1, 2, 3 or 4, or through capillary drain 209, to space 49. The latter is by gravity on lunar missions and the like, or by boiling or both. This shunt ejectment by leaving a void in space 205, thus throttles the ejectment of heat through the primary radiator to correspond with the heat output decrease of source 13 and this maintains a constant power output from the generator 11 such is shown by the solid line in FIG. 5.

This system, designated as the VCG liquid withdrawal system, however, is heavier than the above-described variable area radiator system (designated as the VAP system). A system of by-passing elements (thermocouples) of the electrical circuit upon command of actuators 1, 2, 3, or 4, such as by electrical shunts (like switch 301) designated as the VCG² system is also heavier than the VAP system as shown by the following:

TABLE I.—WEIGHT CONSIDERATIONS

| Component | Material | Qty. | Total Weight VAP | Pounds VCG Liquid Withdrawal | VCG Conduction Members |
|---|---|---|---|---|---|
| Primary Generator: | | | | | |
| Thermoelectric material | PbTe | 108T/e's | .66 | .66 | .66 |
| Conductors | Aluminum | 110 cond's. | .082 | .082 | .082 |
| Elect. Ins. | BeO | 108 | .041 | .041 | .041 |
| Compliant Members | NAK filled S.S. Tubes | 8 | .16 | .16 | .16 |
| Primary Radiators | Alum | 4 | 1.0 | 1.0 | 1.0 |
| Heat Spreaders | Beryllium | 2 | .34 | .34 | .34 |
| Inner Shell | S.S. Clad Aluminum | 1 | .33 | .33 | .47 |
| Outer Shell | Aluminum | 1 | .5 | .7 | .6 |
| Thermal Insulation | Min-k | As req'd | .40 | .42 | .44 |
| Primary Generators: | | | | | |
| Thermoelectric materials | PbTe | 44T/e's | | .134 | .134 |
| Conductors | Aluminum | 90 | | .11 | .11 |
| Elect. Ins. | BeO | 44 | | .055 | .055 |
| Compliant Members | NaK filled S.S. Tubes | 8 | | .16 | .16 |
| Conduction Members | Aluminum | 8 | | .21 | .21 |
| Secondary Radiator System: | | | | | |
| Springs | Rene' 41 | 6 | .1 | | |
| Stems | Aluminum | 6 | .03 | | |
| Bushings | Stainless | 6 | .1 | | |
| Insulation | Min-k | As Req'd | .1 | | |
| Radiator | Alum | 6 | .1 | | |
| Auxilliary Components: | | | | | |
| Timer | Estimated Weight | 1 | 0.5 | 0.5 | 0.5 |
| Valves | | 2 | | .15 | |
| Actuators | | As Req'd | <.1 | | .25 |

The VAP system of this invention provides a variable area throttle for flattening the power output of a radio-isotope powered thermoelectric generator. This invention has the advantage of decreasing radiator weight, source weight and of increasing the end of mission efficiency and the operating life of the generator. Additionally this invention provides a maximum ΔT across the generator and a safe and reliable system. In the preferred embodiment this invention ejects secondary external radiation segments automatically, reliably and efficiently to maintain a constant generator thermal flux and electrical output e.g. +15%−10% for at least ¾ of a half life, with small cost and great simplicity of assembly and operation. This system additionally has the advantage of easy adjustment of the temperature and time sequences or radiator area and a wide range of applications, types of loads, power levels and operating life times can be accomplished.

I claim:

1. A secondary radiator for removing excess heat from a radioisotope heated thermoelectric generator having a radioisotope heat source and thermocouples for producing an electric current directly from the heat supplied by said heat source, comprising a plurality of oppositely disposed external secondary radiation segments having external radiating surfaces and heat conductors thermally connecting said radiating surfaces with said heat source to remove excess heat from said source, means for thermally shielding adjacent of said radiating surfaces from each other, spring means between said heat conductors and said heat source, means for holding said spring means equally under compression, and means for releasing opposite of said spring means with opposite of said secondary radiating surfaces to throttle the rejection of heat by said secondary radiators so as to prevent unequal thrusts in the ejectment of said secondary radiator segments by said spring means.

2. A secondary radiator for removing excess heat from a radioisotope heated thermoelectric generator having a radioisotope heat source and thermocouples for producing an electric current from the heat supplied by said heat source, comprising a plurality of oppositely disposed external secondary radiator segments having external radiating surfaces and heat conductors thermally connecting said radiating surfaces with said heat source to remove excess heat from said source, external lightweight insulating means for thermally shielding adjacent of said radiating surfaces from each other, spring means between said heat conductors and heat source, burnable fuse means having an extension between opposite spring means for holding said spring means equally under compression, and ignitors for sequentially igniting said fuse means to release opposite of said spring means sequentially with opposite of said secondary radiating surfaces to throttle the rejection of heat from said source by said secondary radiator thereby to flatten the power output of said thermocouples with a light weight, dependable, and efficient system.

3. A secondary radiator for removing excess heat from a radioisotope heated thermoelectric generator having a radioisotope heat source and thermocouples for producing an electric current from the heat supplied by said heat source, comprising a plurality of oppositely disposed external secondary radiator segments having external radiating surfaces and heat conducting means thermally connecting said radiating surfaces with said heat source to remove excess heat from said source, external lightweight insulating means for thermally shielding adjacent of said radiating surfaces from each other, spring means between said heat conductors and said heat source, means for holding said spring means equally under compression, timing means for releasing opposite of said spring means sequentially with opposite of said secondary radiating surfaces to throttle the rejection of heat by said secondary radiator substantially to zero, and temperature sensitive means responsive to the heat transfer from the source controlling the operation of said timing means so that said secondary radiator flattens the power output of said thermocouples in correspondence with the radio-nuclide decay of said radioisotope heat source.

4. A radioisotope powered thermoelectric generator, comprising a strontium 90 heat source, lead telluride thermocouples having hot and cold junctions for producing electric current from the heat supplied by said source, a primary external aluminum radiator for maintaining a differential temperature between said junctions, an external secondary segmented aluminum radiator having ejectable radiator surfaces for ejecting excess heat from said source, means shielding said secondary surfaces from each other and said source, burnable means for releasing said secondary radiating surfaces, and means for actuating said burnable means sequentially so that the ejectment of heat by said secondary radiator is throttled increasingly by decreasing its area as the heat from said source decreases due to radio-nuclide decay thereof thus to maintain a constant thermal flux and power output in said generator.

5. A radioisotope powered thermoelectric generator, comprising thermocouples having hot and cold junctions, means for cooling said cold junctions, a radioisotope source for heating said hot junctions to produce current flow from said thermocouples, external means having external ejectable heat conducting segments for ejecting heat from said source, spring means for ejecting said segments, and means for actuating the ejectment of said segments sequentially to throttle said excess heat rejection as said radioisotope decays.

6. The method of flattening the power output of a radioisotope powered thermoelectric generator, comprising the steps of externally rejecting excess heat from the radioisotope through removable radiators that are all operable at the beginning of the operating life-time of said generator, and throttling said rejection of excess heat by ejecting and separating said radiators sequentially at least as the mission time/radioisotope half life ratio increases to at least .62 whereby said generator has high end of mission efficiency.

References Cited by the Examiner

UNITED STATES PATENTS

| | | | |
|---|---|---|---|
| Re. 19,114 | 3/1934 | Stein et al. | 290—2 |
| 2,765,414 | 10/1956 | Gendler et al. | 290—2 |
| 2,913,510 | 11/1959 | Birden et al. | 136—4 |

WINSTON A. DOUGLAS, *Primary Examiner.*

A. M. BEKELMAN, *Assistant Examiner.*